No. 677,033. Patented June 25, 1901.
J. KALGREEN.
BOX TRIMMING MACHINE.
(Application filed Nov. 8, 1900.)
(No Model.) 2 Sheets—Sheet 2.
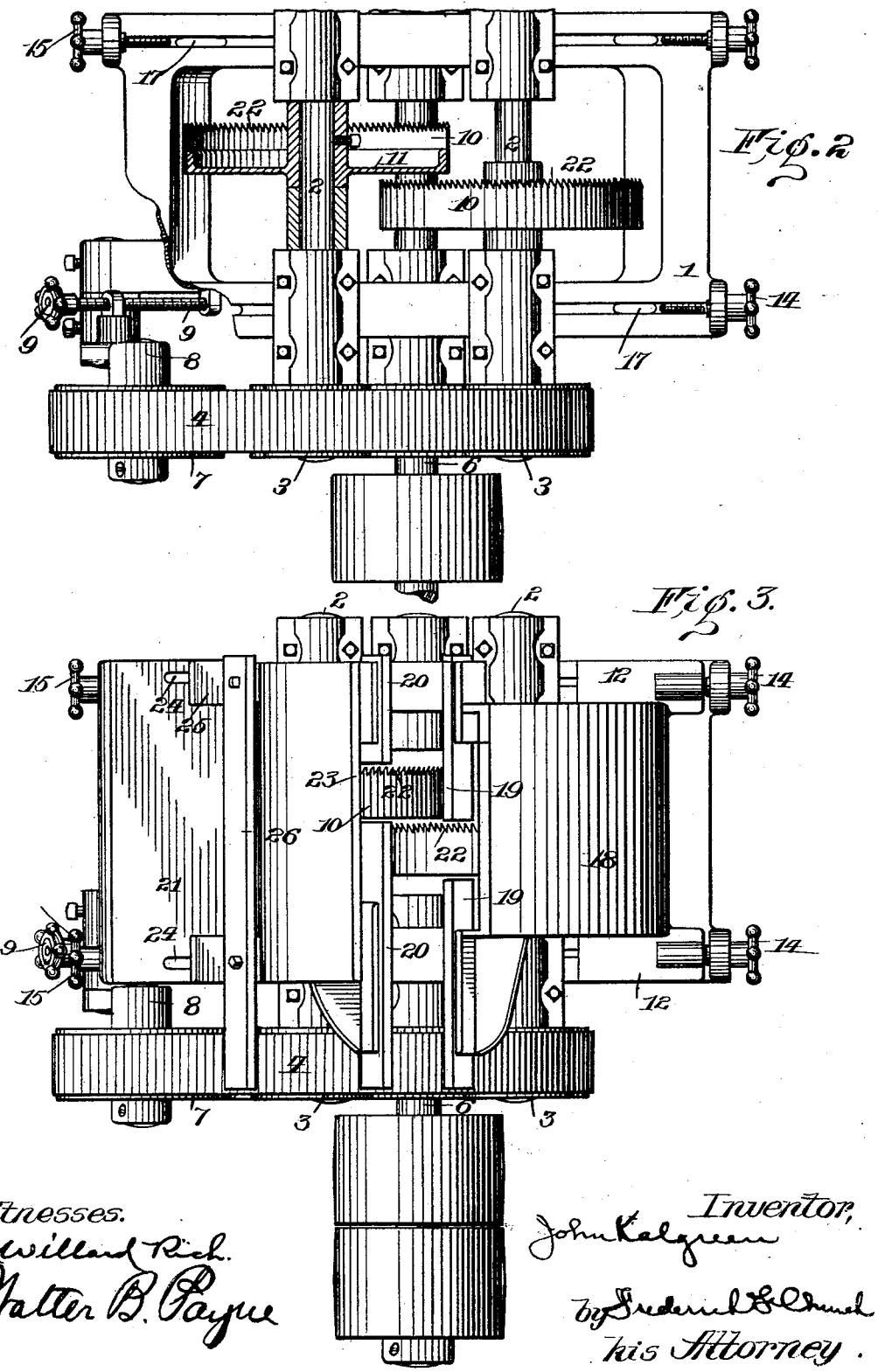

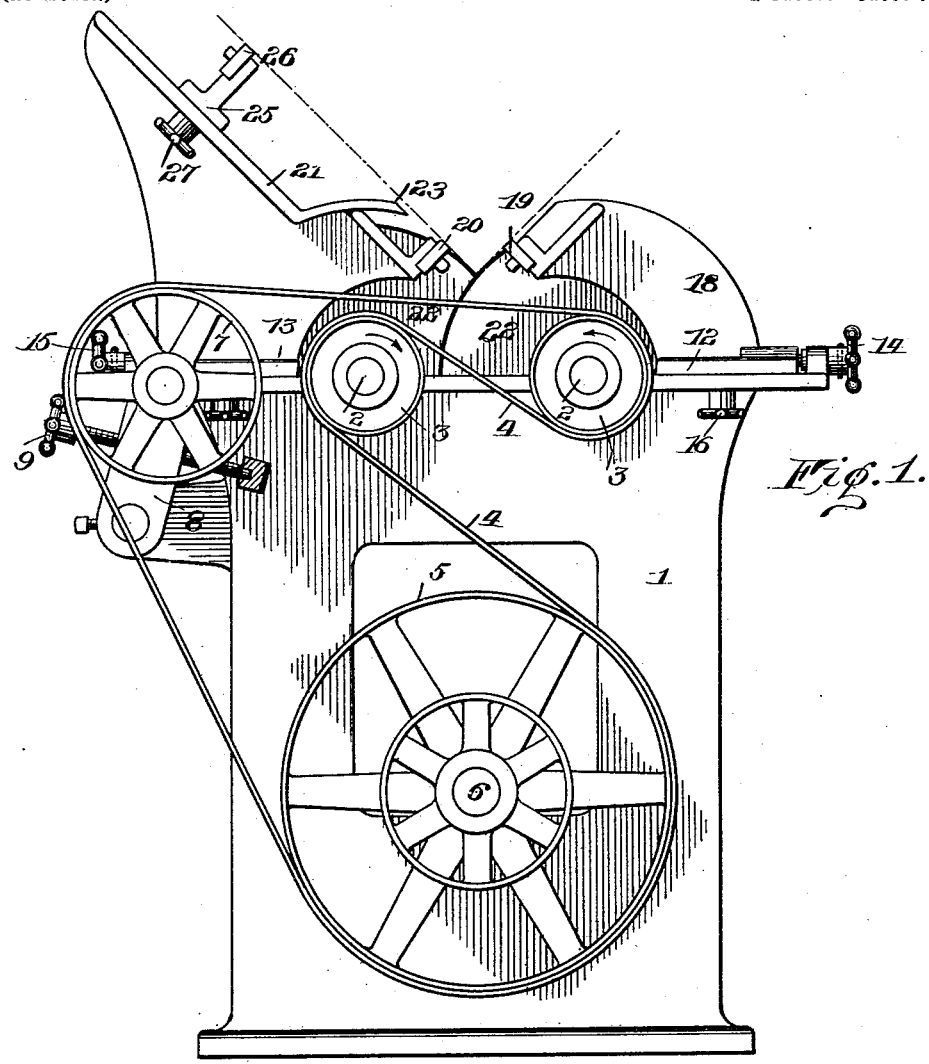

UNITED STATES PATENT OFFICE.

JOHN KALGREEN, OF MINNEAPOLIS, MINNESOTA, ASSIGNOR TO THE MORGAN MACHINE CO., OF ROCHESTER, NEW YORK.

BOX-TRIMMING MACHINE.

SPECIFICATION forming part of Letters Patent No. 677,033, dated June 25, 1901.

Application filed November 8, 1900. Serial No. 35,859. (No model.)

*To all whom it may concern:*

Be it known that I, JOHN KALGREEN, of Minneapolis, in the county of Hennepin, in the State of Minnesota, have invented certain new and useful Improvements in Box-Trimming Machines; and I do hereby declare the following to be a full, clear, and exact description of the same, reference being had to the accompanying drawings, forming a part of this specification, and to the reference-numerals marked thereon.

My present invention relates to improvements in machines such as shown in Letters Patent No. 541,376, granted June 18, 1895, to H. W. Morgan, for trimming lock-corner boxes and similar articles; and it consists in certain improvements which facilitate the construction and improve the operation of the machine, whereby the sides of the edges or corners of boxes may be operated upon in an efficient manner even when the boxes are formed of soft wood, all as will be hereinafter fully described, and the novel features pointed out in the claims at the end of this specification.

In the accompanying drawings, Figure 1 is a side elevation of a trimming-machine constructed in accordance with my invention; Fig. 2, a plan view of the same, showing one of the cutters in section and the upper portion of the casing and the box-supports removed; and Fig. 3, a plan view of the machine complete.

Similar reference-numerals indicate similar parts.

The main frame of the machine (indicated by 1) may be of any suitable form, but preferably rectangular, as shown, and is provided at its top near the center with suitable bearings, in which are journaled shafts or arbors 2, each arbor being provided on the outer end with a belt-pulley 3, and around these pulleys extends a driving-belt 4 and also passing around a pulley 5 on a shaft 6, journaled in the lower portion of the frame, said belt also extending around a tightener-pulley 7, mounted upon a pivoted arm 8, which is adapted to be adjusted by a screw 9. Arranged upon the arbors 2 and preferably intermediate their bearings are annular cutters having their teeth projecting in a plane parallel with that of the arbors, said cutters being relatively arranged with their cutting edges at an angle, preferably as near a right angle as their radii will permit, as shown in Figs. 2 and 3, and being formed, preferably, by securing a section of a band-saw (indicated by 10) to the periphery of a wheel or disk 11, secured upon the arbor, the teeth projecting considerably forward of the edge of the wheel or disk 11, as shown. Inasmuch as the cutters are adapted in machines of this class to remove merely the projecting edges of the tongues at the corners of lock-corner boxes, it is not necessary that the cutters extend back any considerable distance from the serrated edges, although, if desired, deeper cutters than those shown could be employed. Formed upon the upper surface of the main frame 1 and in the rear of each of the cutter-arbors are ways or guides upon which operate carriages 12 and 13, capable of adjustment upon the main frame by means of the set-screws 14 and 15 and being secured in adjusted position by hand-nuts 16, located on the lower ends of suitable bolts attached to the carriages and passing through slots 17, formed in the ways or guides. The carriage 12 is provided with a curved portion or housing 18, extending from the rear up over the cutter 22, and is provided just above the latter with adjustable box-supporting strips 19, preferably extending close to the front and rear sides of the cutter. The carriage 13 is provided at its inner forward edge with adjustable blocks or bars 20, also arranged on opposite sides of the cutter 2 and similar in other respects to the bars 19, and above these bars is an inclined plate 21, provided with a projecting surface 23 and near its rear portion with slots 24, in which operate the shanks of screws secured to brackets 25, carrying the bar or support 26, said screws being provided with operating-handles 27, by means of which the bar 26 may be adjusted on the plate 21 and secured readily in position. The bars 26 and 20 form, it will be understood, a support for one side of the box operated upon, and the bar 19, the face of which is arranged, preferably, at right angles to that of the bar 20, serves as a support for the other side or edge of the box, the cutting edges of the cutters forming the apex of the angle between these supports.

From the above description it will be seen that when the cutters are rotated in the direction indicated by the arrows and the box or other article to be trimmed is passed over the cutters, with the sides resting upon the supports 19, 20, 23, and 26, as indicated in dotted lines in Fig. 1, the projecting tongues will be removed by the cutters and the corners of the box left approximately square.

I have found in practice that machines of this description are very efficient, even when operating upon boxes made of soft wood, such as cottonwood, and also the employment of cutters of this description enables me to provide a machine having bearing-surfaces for the work-support and extending in a horizontal plane and cutter-arbors extending in a parallel plane, thereby facilitating the construction of the machine and dispensing with cross-shafts and unusual castings. The frames carrying the box-supports also constitute housings or covers for the cutters and protect the operator from injury by contact therewith and also prevent the blocks cut off from flying.

I claim as my invention—

1. In a trimmer the combination with the two parallel box-supports arranged to engage two adjacent sides of the corner of a box resting thereon, of a rotary arbor extending in a plane parallel with said supports and a cutter thereon adapted to coöperate with the box near the corner thereof.

2. In a trimmer the combination with the two parallel box-supports arranged to engage two adjacent sides of the corner of a box resting thereon, of two rotary arbors extending in planes parallel with said supports and a cutter on each arbor adapted to coöperate with one side of the box near the corner thereof.

3. In a trimmer the combination with the two parallel box-supports relatively adjustable toward and from each other and adapted to engage two adjacent sides of the corner of a box resting thereon, of a rotary arbor in stationary bearings and extending in a plane parallel with said supports and a cutter thereon adapted to coöperate with the box near the corner thereof.

4. In a trimmer the combination with the two parallel box-supports relatively adjustable toward and from each other and adapted to engage two adjacent sides of the corner of a box resting thereon, of two rotary arbors extending parallel with said supports and a cutter upon each of said arbors.

5. In a trimmer the combination with the two parallel box-supports adapted to engage two adjacent sides of the corner of a box resting thereon, of two rotary arbors extending parallel with the supports and cutters on the arbors having their teeth projecting in a plane parallel with those of the arbors.

6. In a trimmer the combination with the two parallel box-supports adapted to engage two adjacent sides of the corner of a box resting thereon, of two rotary arbors both extending parallel with the box-supports and the cutters thereon having their cutting edges extending parallel with the arbors and extending past each other to operate upon the sides of the corners of the box on the supports.

7. In a trimmer the combination with the main frame, the two parallel rotary arbors thereon and the tubular cutters on the arbors having their peripheries overlapping, of the relatively adjustable frames on opposite sides of the arbors and the box-supports thereon extending parallel with the arbors and separated to permit the passage of the box-corner between them.

JOHN KALGREEN.

Witnesses:
A. J. DAVIS,
PAUL E. VON KUSTER.